(12) United States Patent
Yamaguchi et al.

(10) Patent No.: US 8,679,683 B2
(45) Date of Patent: *Mar. 25, 2014

(54) ELECTROLYTE SOLUTION CONTAINING A CYCLIC IMIDE SALT AND LIGHT METAL SALT AND BATTERY

(75) Inventors: Akira Yamaguchi, Fukushima (JP); Atsumichi Kawashima, Fukushima (JP); Masayuki Ihara, Fukushima (JP); Hiroshi Horiuchi, Fukushima (JP); Hiroyuki Yamaguchi, Fukushima (JP); Tadahiko Kubota, Kanagawa (JP); Kumiko Takagi, Fukushima (JP)

(73) Assignee: Sony Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/684,875

(22) Filed: Mar. 12, 2007

(65) Prior Publication Data

US 2008/0193854 A1 Aug. 14, 2008

(30) Foreign Application Priority Data

Mar. 22, 2006 (JP) ................. P2006-079695

(51) Int. Cl.
*H01M 10/0568* (2010.01)
*H01M 6/16* (2006.01)
*H01M 10/0569* (2010.01)

(52) U.S. Cl.
USPC ............................ 429/328; 429/330; 429/326

(58) Field of Classification Search
USPC ................................ 429/188–347
See application file for complete search history.

(56) References Cited

U.S. PATENT DOCUMENTS

| | | | | |
|---|---|---|---|---|
| 5,691,081 A | * | 11/1997 | Krause et al. ................. | 429/307 |
| 2005/0095503 A1 | * | 5/2005 | Adachi et al. ................. | 429/188 |
| 2006/0228626 A1 | * | 10/2006 | Kawashima et al. .......... | 429/200 |

FOREIGN PATENT DOCUMENTS

| | | | | | |
|---|---|---|---|---|---|
| EP | 1 231 654 | | 8/2002 | | |
| JP | 08241733 A | * | 9/1996 | ............ | H01M 10/40 |
| JP | 2002151144 A | * | 5/2002 | ............ | H01M 10/40 |
| JP | 2002-289189 A | | 10/2002 | | |
| JP | 2004-253296 A | | 9/2004 | | |
| JP | 2004-363086 A | | 12/2004 | | |
| JP | 2005-005116 A | | 1/2005 | | |
| JP | 2005-005118 A | | 1/2005 | | |
| JP | 2006-032300 A | | 2/2006 | | |
| WO | 01/31724 | | 5/2001 | | |
| WO | WO 2004051784 A1 | * | 6/2004 | ............ | H01M 10/40 |
| WO | WO 2005104274 A1 | * | 11/2005 | ............... | H01M 4/58 |
| WO | WO 2005114773 A1 | * | 12/2005 | ............ | H01M 10/40 |
| WO | WO 2006033358 A1 | * | 3/2006 | ............ | H01M 10/40 |

OTHER PUBLICATIONS

Chemical compound information from chemBlink.com for the following compunds: 4-fluoro-1,3-dioxolane-2-one, ethylene carbonate, dimethyl carbonate, and lithium bis(oxalate)borate. Accessed on Sep. 25, 2008 (8 Pages).*
Chemical compound information from chemBlink.com for the following compunds: diethyl carbonate. Accessed on Apr. 24, 2009 (2 Pages).*
Machine translation of Takeuchi et al., JP 2002-151144 A.*
SciFinder Citation for Takeuchi et al., JP 2002-151144 A.*
Machine translation for Takechi et al., JP2002-151144 A.*

* cited by examiner

*Primary Examiner* — Edu E Enin-Okut
(74) *Attorney, Agent, or Firm* — Sheridan Ross P.C.

(57) ABSTRACT

An electrolytic solution capable of improving battery characteristics even at high temperature, and a battery using the electrolytic solution are provided. A separator is impregnated with an electrolytic solution. The electrolytic solution includes a cyclic imide salt such as 1,1,2,2,3,3-hexafluoropropane-1,3-disulfonimide lithium and a light metal salt such as difluoro[oxalato-O,O'] lithium borate or bis[oxalato-O,O'] lithium borate. Thereby, the decomposition reaction of the electrolytic solution can be prevented even at high temperature, and the battery characteristics can be improved.

9 Claims, 5 Drawing Sheets

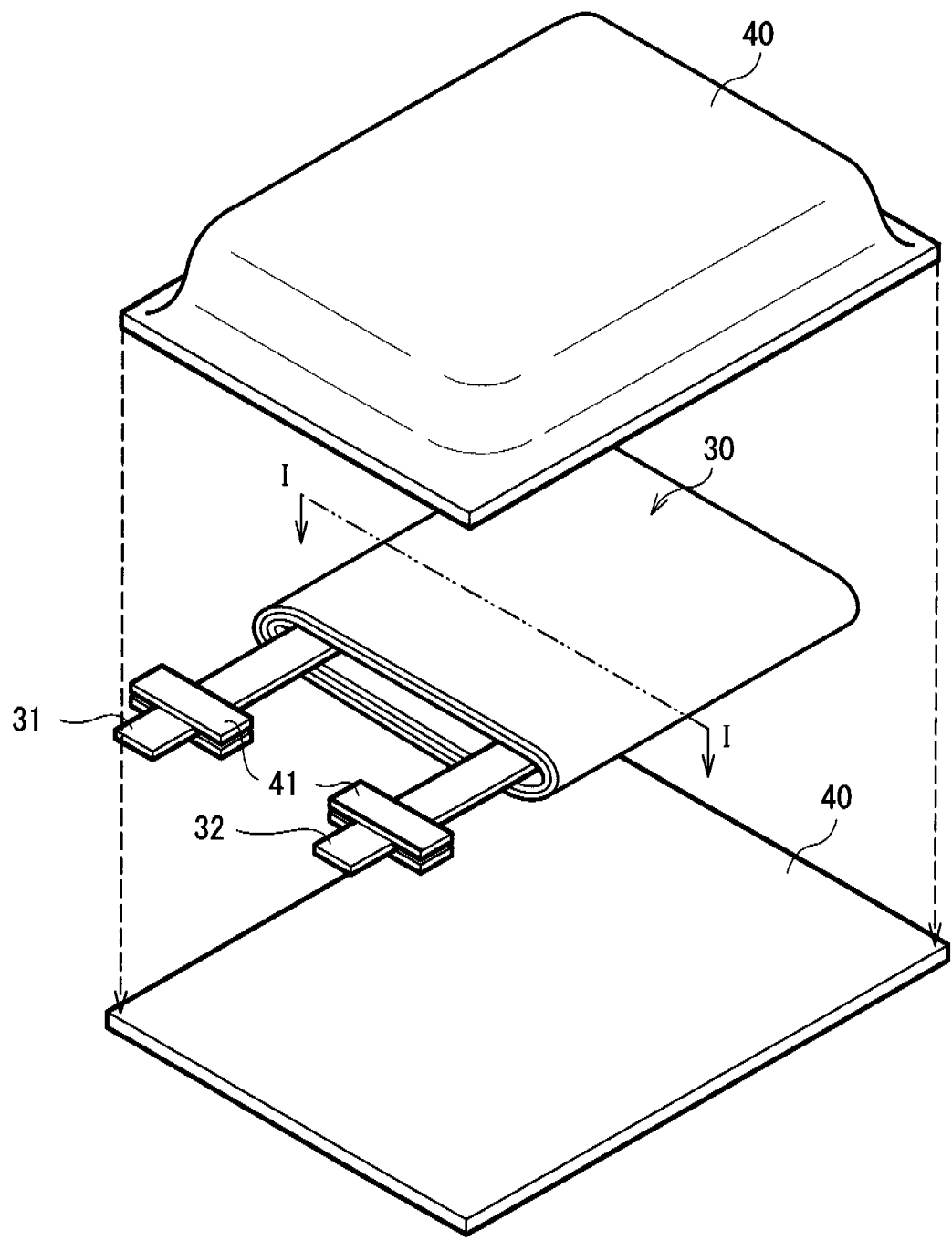
F I G. 3

ELECTROLYTE SOLUTION CONTAINING A CYCLIC IMIDE SALT AND LIGHT METAL SALT AND BATTERY

CROSS REFERENCES TO RELATED APPLICATIONS

The present invention contains subject matter related to Japanese Patent Application JP 2006-079695 filed in the Japanese Patent Office on Mar. 22, 2006, the entire contents of which being incorporated herein by reference.

BACKGROUND OF THE INVENTION

1. Field of the Invention

The present invention relates to an electrolytic solution including an electrolyte salt and a battery using the electrolytic solution.

2. Description of the Related Art

In recent years, a large number of portable electronic devices such as camcorders, digital still cameras, cellular phones, personal digital assistances and laptop computers have been emerged, and an attempt to reduce the size and the weight of them has been made. Accordingly, the research and development of batteries, specifically secondary batteries as portable power sources for the electronic devices for improving an energy density have been actively promoted. Among them, a lithium-ion secondary battery using a carbon material for an anode, lithium (Li) for a cathode and a carbonate for an electrolytic solution has been widely put to practical use, because the lithium-ion secondary battery can obtain a larger energy density than a lead-acid battery and a nickel-cadmium battery in related arts.

Moreover, recently as the performance of portable electronic devices is enhanced, further improvement in capacity is desired, and it is considered to use tin (Sn) or silicon (Si) as an anode active material instead of a carbon material. The theoretical capacity of tin is 994 mAh/g, the theoretical capacity of silicon is 4199 mAh/g, so the theoretical capacities of tin and silicon are much larger than the theoretical capacity of graphite, 372 mAh/g, so an increase in capacity can be expected. In particular, it has been reported that in an anode formed by forming a thin film of tin or silicon on a current collector, an anode active material is not pulverized by insertion and extraction of lithium and a relatively large discharge capacity can be maintained (for example, refer to the pamphlet of International Publication No. WO01/031724).

Further, as a secondary battery capable of obtaining a high energy density, there is a lithium metal secondary battery using lithium metal for an anode and using only precipitation and dissolution reactions of lithium metal for an anode reaction. The lithium metal has a large theoretical electrochemical equivalent of 2054 mAh/cm$^3$, which is 2.5 times larger than that of graphite, so the lithium metal secondary battery holds promise of improving the capacity. A large number of researchers have been conducting research and development aimed at putting the lithium metal secondary battery to practical use (for example, refer to "Lithium Batteries" Edited by Jean-Paul Gabano, Academic Press, 1983, London, N.Y.).

SUMMARY OF THE INVENTION

However, the heat generation of the high-end CPU of a personal computer has been increased recently, so batteries are often charged and discharged at a high temperature of approximately 50° C. Thereby, a decline in battery characteristics is an issue. Therefore, the development of batteries capable of obtaining superior battery characteristics not only under a room temperature environment but also a high temperature environment has been in demand.

In view of the foregoing, it is desirable to provide an electrolytic solution capable of improving battery characteristics even at high temperature, and a battery using the electrolytic solution.

According to an embodiment of the invention, there is provided an electrolytic solution including: a cyclic imide salt; and a light metal salt shown in Chemical Formula 1.

[Chemical Formula 1]

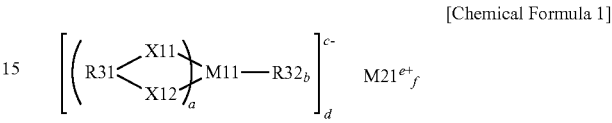

where R31 represents a —C(=O)—R41-C(=O)— group (R41 represents an alkylene group, a halogenated alkylene group, an arylene group or a halogenated arylene group), a —C(=O)—C(R43)(R44)- group (R43 and R44 each represent an alkyl group, a halogenated alkyl group, an aryl group or a halogenated aryl group), or a —C(=O)—C(=O)— group, R32 represents halogen, an alkyl group, a halogenated alkyl group, an aryl group or a halogenated aryl group, X11 and X12 each represent oxygen (O) or sulfur (S), M11 represents a transition metal element, or a Group 3B element, a Group 4B element or a Group 5B element in the short form of the periodic table of the elements, M21 represents a Group 1A element or a Group 2A element in the short form of the periodic table of the elements, or aluminum (Al), a is an integer of 1 to 4, b is an integer of 0 to 8, and c, d, e and f each are an integer of 1 to 3.

According to an embodiment of the invention, there is provided a battery including a cathode, an anode and an electrolytic solution wherein the electrolytic solution includes a cyclic imide salt and a light metal salt shown in Chemical Formula 2.

[Chemical Formula 2]

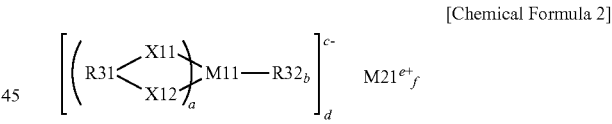

where R31 represents a —C(=O)—R41-C(=O)— group (R41 represents an alkylene group, a halogenated alkylene group, an arylene group or a halogenated arylene group), a —C(=O)—C(R43)(R44)- group (R43 and R44 each represent an alkyl group, a halogenated alkyl group, an aryl group or a halogenated aryl group), or a —C(=O)—C(=O)— group, R32 represents halogen, an alkyl group, a halogenated alkyl group, an aryl group or a halogenated aryl group, X11 and X12 each represent oxygen (O) or sulfur (S), M11 represents a transition metal element, or a Group 3B element, a Group 4B element or a Group 5B element in the short form of the periodic table of the elements, M21 represents a Group 1A element or a Group 2A element in the short form of the periodic table of the elements, or aluminum (Al), a is an integer of 1 to 4, b is an integer of 0 to 8, and c, d, e and f each are an integer of 1 to 3.

In the electrolyte solution according to the embodiment of the invention, the cyclic imide salt and the light metal salt shown in Chemical Formula 1 are included, so the chemical stability of the electrolytic solution can be improved even at high temperature. Therefore, in the battery using the electrolytic solution according to the embodiment of the invention, the decomposition reaction of the electrolytic solution can be prevented even at high temperature, and battery characteristics can be improved.

In particular, when the content of the light metal salt shown in Chemical Formula 1 or 2 in the electrolytic solution is within a range from 0.05 wt % to 10 wt % inclusive, a higher effect can be obtained.

Other and further objects, features and advantages of the invention will appear more fully from the following description.

BRIEF DESCRIPTION OF THE DRAWINGS

FIG. 3 is an exploded perspective view of a fourth secondary battery using the electrolytic solution according to the embodiment of the invention;

DETAILED DESCRIPTION OF THE PREFERRED EMBODIMENTS

Figure 1:
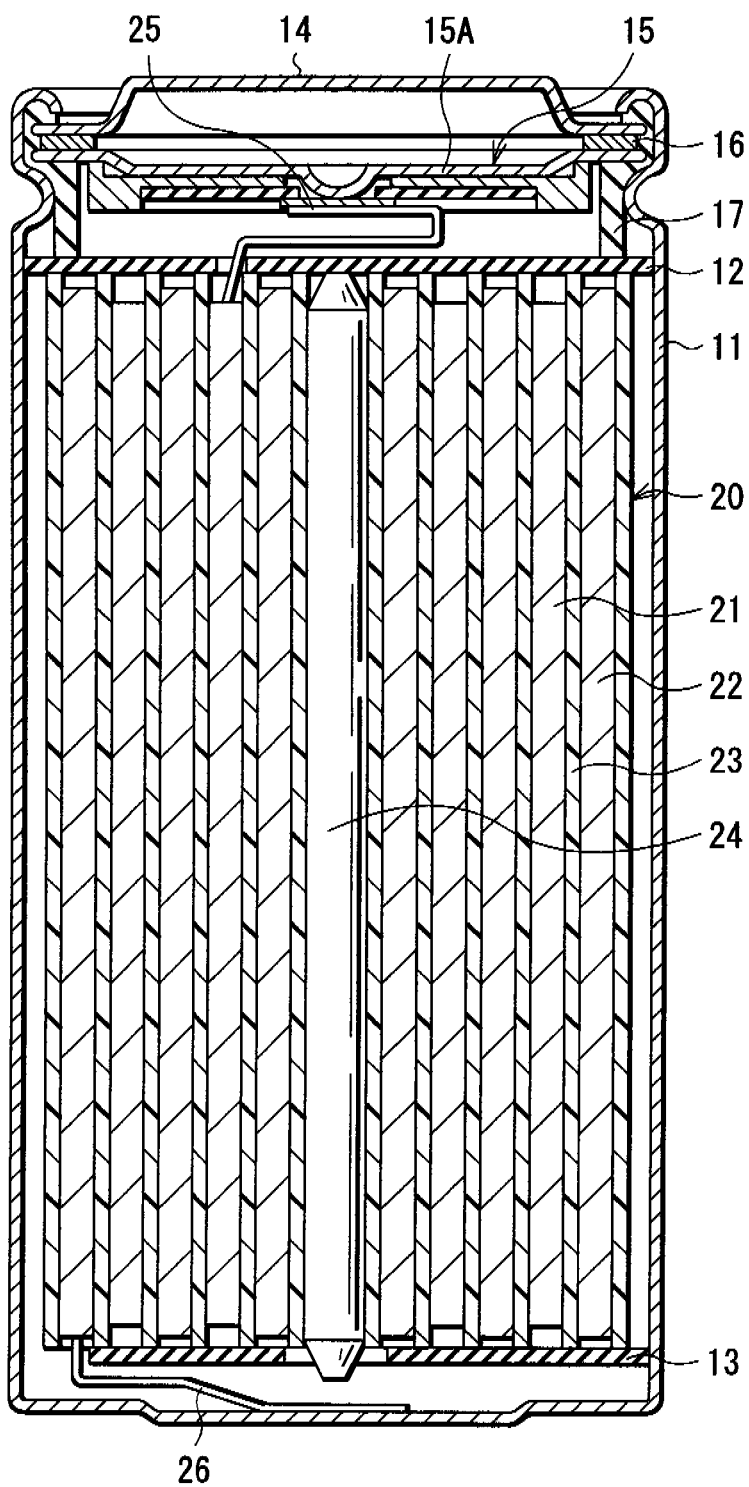
FIG. 1 is a sectional view of a first secondary battery using an electrolytic solution according to an embodiment of the invention.

A preferred embodiment will be described in detail below referring to the accompanying drawings.

An electrolytic solution according to an embodiment of the invention includes, for example, a solvent and an electrolyte salt dissolved in the solvent.

The solvent includes a high permittivity solvent with a relative permittivity of 30 or more, because the number of lithium ions can be increased by the high permittivity solvent. Examples of the high permittivity solvent include ethylene carbonate, propylene carbonate, butylene carbonate, cyclic carbonates such as 1,3-dioxol 2-one and 4-vinyl-1,3-dioxolane-2-one, carbonate derivatives in which at least a part of hydrogen in the cyclic carbonates is substituted with halogen, lactones such as γ-butyrolactone and γ-valerolactone, lactams such as N-methyl-2-pyrrolidone, cyclic carbamates such as 3-methyl-2-oxazolidinone, sulfone compounds such as tetramethylene sulfone and sultones. One kind or a mixture including two or more kinds selected from them may be as the high permittivity solvent.

Moreover, a low viscosity so-vent with a viscosity of 1 mPa·s or less is preferably mixed and used with the high-permittivity solvent, because higher ionic conductivity can be obtained by the low viscosity solvent. Examples of the low viscosity solvent include chain carbonates such as dimethyl carbonate, diethyl carbonate, ethyl methyl carbonate and methyl propyl carbonate, chain carboxylates such as methyl acetate, ethyl acetate, methyl propionate, ethyl propionate, methyl butyrate, methyl isobutyrate, methyl trimethylacetate and ethyl trimethylacetate, ketones such as pinacolin, ethers such as 1,2-dimethoxyethane, tetrahydrofuran, 2-methyltetrahydrofuran, tetrahydropyran, 1,3-dioxolane, 4-methyl-1,3-dioxolane, 1,3-dioxane and 4-dioxane, chain amides such as N,N-dimethylacetamide and N,N-dimethylformamide, and chain carbamates such as methyl-N,N-dimethylcarbamate, methyl-N,N-diethylcarbamate and ethyl-N,N-diethylcarbamate. One kind or a mixture including two or more kinds selected from them may be used as the low-viscosity solvent.

As the electrolyte salt, a cyclic imide salt is included, because not only the cyclic imide salt has a function as an electrolyte salt, but also chemical stability can be improved even at high temperature by the cyclic imide salt. Examples of the cyclic imide salt include compounds shown in Chemical Formulas 3(1) through 3(6). In Chemical Formulas 3(1) through 3(6), alkali metal salts are shown: however, an alkali earth metal salt or an aluminum metal salt which has similar properties can be used.

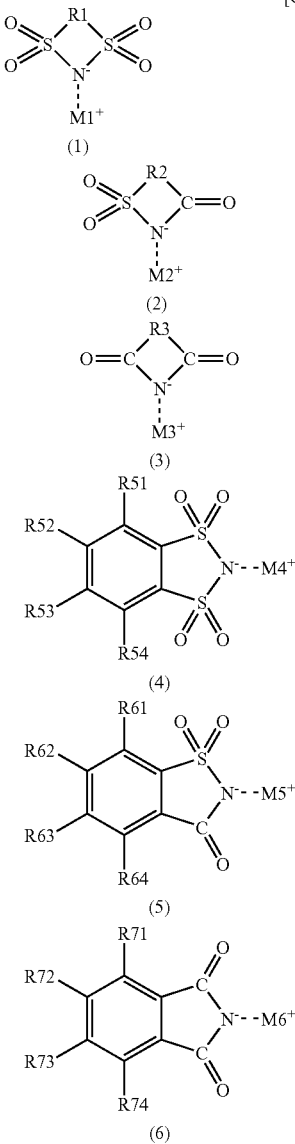

[Chemical Formula 3]

where M1, M2, M3, M4, M5 and M6 each represent alkali metal, R1, R2 and R3 each represent a straight-chain or branched alkylene group having 2 to 5) carbon atoms or a group in which at least a part of hydrogen in the alkylene group is substituted with fluorine, R51, R52, R53, R54, R61, R62, R63, R64, R71, R72, R73 and R74 each represent hydrogen, an alkyl group having 1 to 4 carbon atoms or a group in which at least a part of hydrogen in the alkyl group is substituted with fluorine and R51, R52, R53, R54, R61, R62, R63, R64, R71, R72, R73 and R74 may be the same as or different from one another.

Specific examples of the cyclic imide salt include 1,1,2,2,3,3-hexafluoropropane-1,3-disulfonimide lithium shown in Chemical Formula 4(1), 2,2,3,3,4,4-hexafluoroglutarimide lithium shown in Chemical Formula 4(2), lithium ortho-sulphobenzimide shown in Chemical Formula 4(3), 1,1,2,2,3,3-hexafluoropropane-1,3-disulfonimide sodium, 2,2,3,3,4,4-hexafluoroglutarimide sodium, sodium ortho-sulphobenzimide, 1,1,2,2,3,3 hexafluoropropane-1,3-disulfonimide potassium, 2,2,3,3,4,4-hexafluoroglutarimide potassium, potassium ortho-sulphobenzimide, 1,1,2,2-tetrafluoroethane-1,3-disulfonimide lithium shown in Chemical Formula 4(4), 1-trifluoromethyl-1,2,2,3,3-pentafluoropropane-1,3-disulfonimide lithium shown in Chemical Formula 4(5), 1,1,2,2,3,3,4,4-octafluorobutyl-1,3-disulfonimide lithium shown in Chemical Formula 4(6) the like. Among them, 1,1,2,2,3,3-hexafluoropropane-1,3-disulfonimide lithium, 2,2,3,3,4,4-hexafluoroglutarimide lithium, lithium ortho-sulphobenzimide, 1,1,2,2-tetrafluoroethane-1,3-disulfonimide lithium or 1,1,2,2,3,3,4,4-octafluorobutyl-1,3-disulfonimide lithium is preferable, because a higher effect can be obtained.

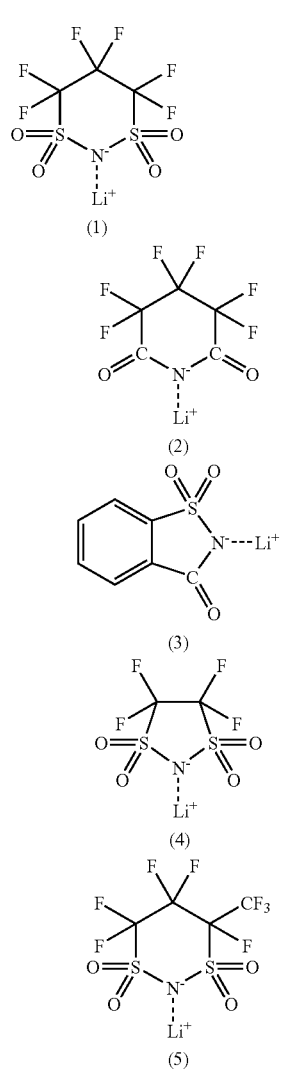

[Chemical Formula 4]

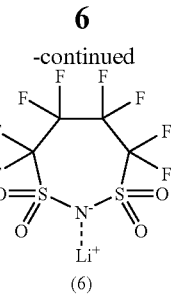

(6)

The content of the cyclic imide salt in the whole electrolytic solution is preferably within a range from 0.1 wt % to 31 wt % inclusive, because a higher effect can be obtained in the range. Only one kind or a mixture including two or more kinds selected from them may be used.

The electrolyte salt includes a light metal salt shown in Chemical Formula 5 in addition to the cyclic imide salt, because not only the light metal salt functions as an electrolyte salt, but also, for example, in the case where the light metal salt is used in a battery, a stable film is formed on a surface of an anode, so the decomposition reaction of the electrolytic solution can be prevented even at high temperature, and the chemical stability of the electrolytic solution can be further improved. Only one kind of light metal salt shown in Chemical Formula 5 or a mixture including a plurality of kinds of light metal salts shown in Chemical Formula 5 may be used.

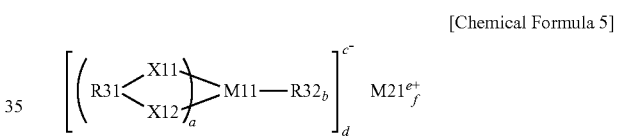

[Chemical Formula 5]

where R31 represents a group shown in Chemical Formula 6(1), 6(2) or 6(3), R32 represents halogen, an alkyl group, a halogenated alkyl group, an aryl group or a halogenated aryl group, X11 and X12 each represent oxygen or sulfur, M11 represents a transition metal element or a Group 3B element, a Group 4B element or a Group 5B element in the short form of the periodic table of the elements, M11 represents a Group 1A element or a Group 2A element in the short form of the periodic table of the elements, or aluminum, a is an integer of 1 to 4, b is an integer of 0 to 8, and c, d, e and f each are an integer of 1 to 3.

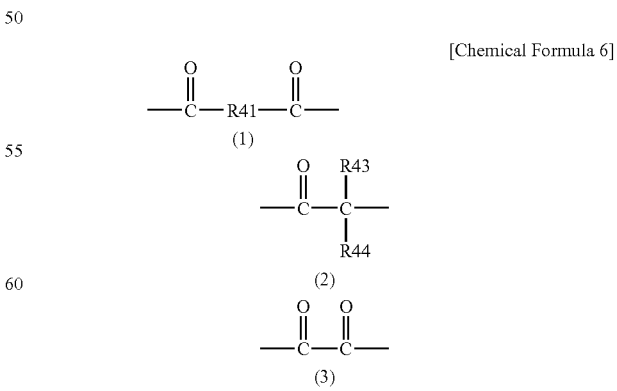

[Chemical Formula 6]

where R41 represents an alkylene group, a halogenated alkylene group, an arylene group or a halogenated arylene group, R43 and R44 each represent an alkyl group, a halogenated alkyl group, an aryl group or a halogenated aryl group, and R43 and R44 may be the same as or different from each other.

As the light metal salt shown in Chemical Formula 5, a light metal salt shown in Chemical Formula 7 is preferable.

[Chemical Formula 7]

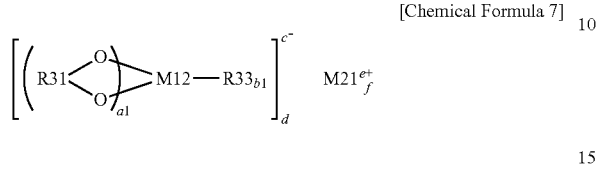

where R31 represents a group shown in Chemical Formula 8(1), 8(2) or 8(3), R33 represents halogen, M12 represents phosphorus (P) or boron (B), M21 represents a Group 1A element or a Group 2A element in the short form of the periodic table of the elements, or aluminum, a1 is an integer of 1 to 3, b1 is 0, 2 or 4, and c, d, e and f each are an integer of 1 to 3.

[Chemical Formula 8]

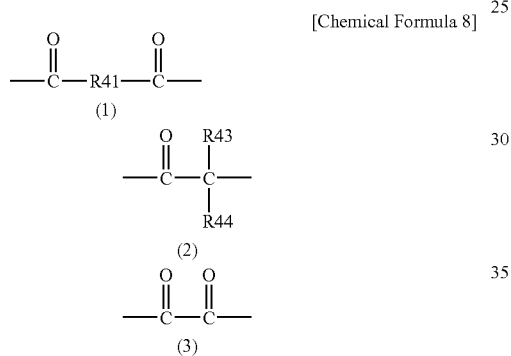

where R41 represents an alkylene group, a halogenated alkylene group, an arylene group or a halogenated arylene group, R43 and R44 each represent an alkyl group, a halogenated alkyl group, an aryl group or a halogenated aryl group, and R43 and R44 may be the same as or different from each other.

Specific examples of the light metal salt shown in Chemical Formula 7 include difluoro[oxalato-O,O'] lithium borate shown in Chemical Formula 9(1), tetrafluoro[oxalato-O,O'] lithium phosphate shown in Chemical Formula 9(2), difluoro bis[oxalato-O,O'] lithium phosphate shown in Chemical Formula 9(3), difluoro[3,3,3-trifluoro-2-oxide-2-trifluoromethyl propionato(2-)-O,O'] lithium borate shown in Chemical Formula 9(4), bis[3,3,3-trifluoro-2-oxide-2-trifluoromethyl propionato(2-)-O,O'] lithium borate shown in Chemical Formula 9(5), bis[oxalato-O,O'] lithium borate shown in Chemical Formula 9(6) and the like.

[Chemical Formula 9]

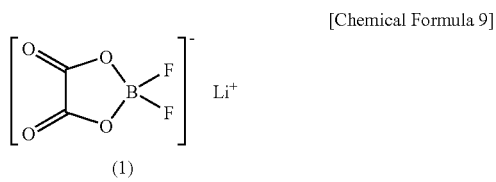

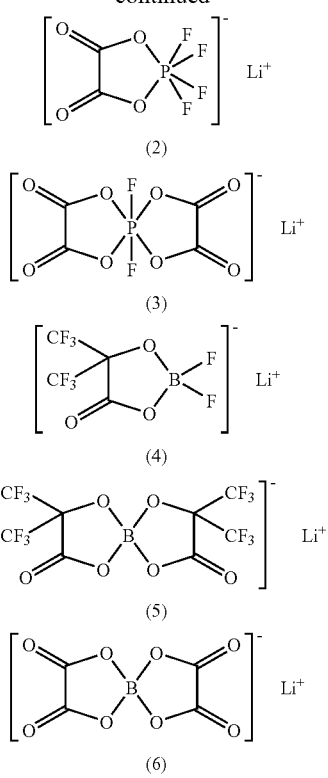

The content of the light metal salt shown in Chemical Formula 5 in the whole electrolytic solution is preferably within a range from 0.05 wt % to 10 wt % inclusive, because a high effect can be obtained in the range.

The light metal salt may include only the cyclic imide salt and the light metal salt shown in Chemical Formula 5; however, one kind or two or more kinds of other salts may be mixed and used. Examples of the other salts include lithium hexafluorophosphate ($LiPF_6$), lithium tetrafluoroborate ($LiBF_4$), lithium hexafluoroarsenate ($LiAsF_6$), lithium hexafluoroantimonate ($LiSbF_6$), lithium hexafluorosilicate ($LiSiF_6$), lithium perchlorate ($LiClO_4$), lithium tetrachloroaluminate ($LiAlCl_4$), lithium chloride (LiCl), lithium bromide (LiBr), lithium tetraphenylborate ($LiB(C_6H_5)_4$), lithium tetrakis(trifluoroacetoxy) borate ($LiB(OCOCF_3)_4$), lithium tetrakis(pentafluoropropioxy) borate ($LiB(OCOC_2F_5)_4$), lithium methanesulfonate ($LiCH_3SO_3$), lithium trifluoromethanesulfonate ($LiCF_3SO_3$), a lithium salt represented by $LiN(CmF_{2m+1}SO_2)(C_nF_{2n+1}SO_2)$ (where m and n each are an integer of 1 or more) such as lithium bis(trifluoromethanesulfone) imide ($LiN(CF_3SO_2)_2$), lithium bis(pentafluoroethanesulfone) imide ($LiN(C_2F_5SO_2)_2$) or lithium (nonafluorobutanesulfone) (trifluoromethanesulfone) imide ($LiN(C_4F_9SO_2)(CF_3SO_2)$) and a lithium salt represented by $LiC(C_pF_{2p+1}SO_2)(C_qF_{2q+1}SO_2)(C_rF_{2r+1}SO_2)$ (where p, q and r each are an integer of 1 or more) such as lithium tris(trifluoromethanesulfone) methide (($CF_3SO_2)_3CLi$).

The electrolytic solution is used for the secondary battery in the following manner, for example.
(First Secondary Battery)
FIG. 1 shows a sectional view of a first secondary battery using the electrolytic solution according to the embodiment. The secondary battery is a so-called lithium-ion secondary battery in which the capacity of an anode is represented by a capacity component by insertion and extraction of lithium as an electrode reactant. The secondary battery is a so-called cylindrical type, and includes a spirally wound electrode body 20 which includes a cathode 21 and an anode 22 spirally wound with a separator 23 in between in a substantially hollow cylindrical-shaped battery can 11. The battery can 11 is made of, for example, nickel (Ni)-plated iron (Fe). An end portion of the battery can 11 is closed, and the other end portion thereof is opened. In the battery can 11, a pair of insulating plates 12 and 13 are disposed such that the spirally wound electrode body 20 is sandwiched therebetween in a direction perpendicular to a peripheral winding surface.

In the opened end portion of the battery can 11, a battery cover 14, and a safety valve mechanism 15 and a positive temperature coefficient device (PTC device) 16 disposed inside the battery cover 14 are mounted by caulking by a gasket 17, and the interior of the battery can 11 is sealed. The battery cover 14 is made of, for example, the same material as that of the battery can 11. The safety valve mechanism 15 is electrically connected to the battery cover 14 through the PTC device 16, and when an internal pressure in the battery increases to a certain extent or higher due to an internal short circuit or external application of heat, a disk plate 15A is flipped so as to disconnect the electrical connection between the battery cover 14 and the spirally wound electrode body 20. When a temperature rises, the PTC device 16 limits a current by an increased resistance to prevent abnormal heat generation by a large current. The gasket 17 is made of, for example, an insulating material, and its surface is coated with asphalt.

A center pin 24 is inserted into the center of the spirally wound electrode body 20. A cathode lead 25 made of aluminum (Al) or the like is connected to the cathode 21 of the spirally wound electrode body 20, and an anode lead 26 made of nickel or the like is connected to the anode 22. The cathode lead 25 is welded to the safety valve mechanism 15 so as to be electrically connected to the battery cover 14, and the anode lead 26 is welded and electrically connected to the battery can 11.

Figure 2:
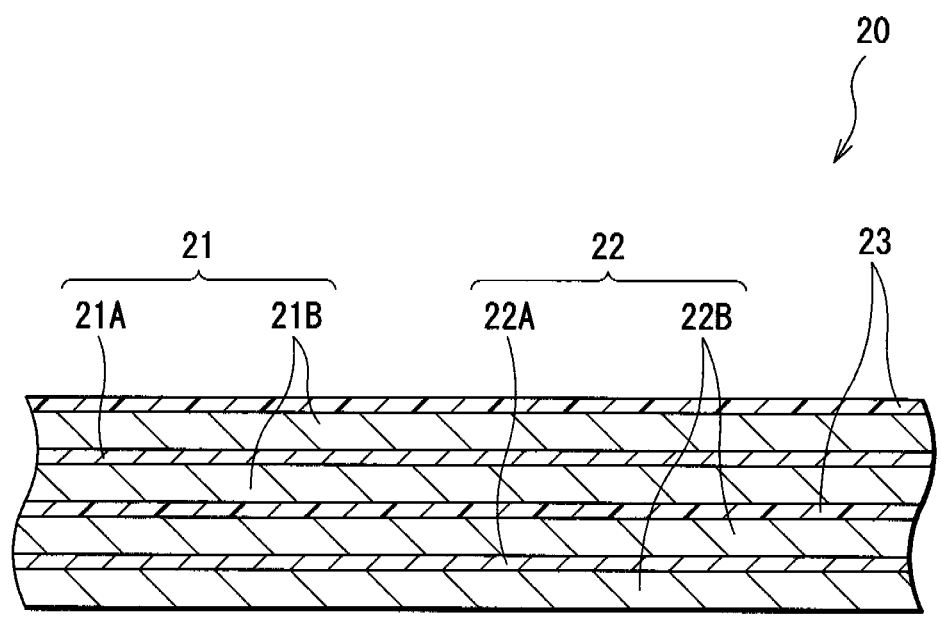
FIG. 2 is a partially enlarged sectional view of a spirally wound electrode body in the secondary battery shown in FIG. 1.

FIG. 2 shows an enlarged view of a part of the spirally wound electrode body 20 shown in FIG. 1. The cathode 21 includes a cathode current collector 21A having a pair of facing surfaces and a cathode active material layer 21B which is arranged on both sides of a cathode current collector 21A. The cathode current collector 21A is made of, for example, a metal material such as aluminum, nickel or stainless. The cathode active material layer 21B includes one kind or two or more kinds of cathode materials capable of inserting and extracting lithium as an electrode reactant, and may include an electrical conductor such as a carbon material and a binder such as polyvinylidene fluoride, if necessary.

As the cathode material capable of inserting and extracting lithium, for example, lithium cobalt oxide, lithium nickel oxide, a solid solution including lithium cobalt oxide and lithium nickel oxide ($Li(Ni_xCo_yMn)O_2$)) (the values of x, y and z are 0<x<1, 0<y<1 and 0<z<1, and x+y+z=1), lithium complex oxide such as lithium manganese oxide ($LiMn_2O_4$) with a spinel structure or a solid solution thereof ($Li(Mn_{2-v}Ni_v)O_4$) (the value of v is v<2), or a phosphate compound with an olivine structure such as lithium iron phosphate ($LiFePO_4$) is preferable, because a high energy density can be obtained. Moreover, Examples of the cathode material capable of inserting and extracting lithium include oxides such as titanium oxide, vanadium oxide and manganese dioxide, bisulfides such as iron bisulfide, titanium bisulfide and molybdenum sulfide, sulfur, and conductive polymers such as polyaniline and polythiophene.

The anode 22 has a structure in which an anode active material layer 22B is arranged on both sides of an anode current collector 22A having a pair of facing surfaces. The anode current collector 22A is made of, for example, a metal material such as copper (Cu), nickel or stainless.

The anode active material layer 22B includes one kind or two or more kinds of anode materials capable of inserting and extracting lithium, and may include an electrical conductor, a binder or the like if necessary. As the anode material capable of inserting and extracting lithium, for example, a material which can insert and extract lithium and includes at least one kind selected from the group consisting of metal elements and metalloid elements as an element is cited. Such an anode material is preferably used, because a high energy density can be obtained. The anode material may include the simple substance, an alloy or a compound of a metal element or a metalloid element, and a phase of one kind or two or more kinds selected from them may be included at least in a part of the anode material. In the invention, the alloy includes an alloy including one or more kinds of metal elements and one or more kinds of metalloid elements in addition to an alloy including two or more kinds of metal elements. Further, the alloy may include a non-metal element. As the texture of the alloy, a solid solution, a eutectic (eutectic mixture), an intermetallic compound or the coexistence of two or more kinds selected from them is cited.

Examples of the metal elements or the metalloid elements included in the anode material include metal elements and metalloid elements capable of forming an alloy with lithium. More specifically, magnesium (Mg), boron (B), aluminum, gallium (Ga), indium (In), silicon, germanium (Ge), tin, lead (Pb), bismuth (Bi), cadmium (Cd), silver (Ag), zinc (Zn), hafnium (Hf), zirconium (Zr), yttrium (Y), palladium (Pd), platinum (Pt) or the like is included. Among them, silicon or tin is specifically preferable, because silicon and tin have a large capability to insert and extract lithium, so a high energy density can be obtained.

As such an anode material, for example, an anode material including tin as a first element, a second element and a third element is preferable. The second element includes at least one kind selected from the group consisting of cobalt (Co), iron, magnesium, titanium (Ti), vanadium (V), chromium (Cr), manganese (Mn), nickel, copper, zinc, gallium, zirconium, niobium (Nb), molybdenum (Mo), silver, indium, cerium (Ce), hafnium, tantalum (Ta), tungsten (W), bismuth and silicon. The third element includes at least one kind selected from the group consisting of boron, carbon (C), aluminum and phosphorus (P). When the second element and the third element are included, cycle characteristics can be improved.

Among them, as the anode material, a CoSnC-containing material in which tin, cobalt and carbon are included as elements, and the carbon content is within a range from 9.9 wt % to 29.7 wt % inclusive, and the ratio of cobalt to the total of tin and cobalt (Co/(Sn+Co)) is within a range from 30 wt % to 70 wt % inclusive is preferable, because a high energy density and superior cycle characteristics can be obtained in such a composition range.

The CoSnC-containing material may include any other element, if necessary. As the element, for example, silicon, iron, nickel, chromium, indium, niobium, germanium, titanium, molybdenum, aluminum, phosphorus, gallium or bismuth is preferable, and two or more kinds selected from them may be included. It is because the capacity or the cycle characteristics can be further improved.

The CoSnC-containing material includes a phase including tin, cobalt and carbon, and the phase preferably has a low crystalline structure or an amorphous structure. Moreover, in the CoSnC-containing material, at least a part of carbon as an element is preferably bonded to a metal element or a metalloid element as another element. It is considered that a decline in the cycle characteristics is caused by cohesion or crystallization of tin or the like, and when carbon is bonded to another element, such cohesion or crystallization can be prevented.

As a measuring method for checking the bonding state of an element, for example, X-ray photoelectron spectroscopy (XPS) is used. In the XPS, the peak of the 1 s orbit (C1 s) of carbon in the case of graphite is observed at 284.5 eV in an apparatus in which energy calibration is performed so that the peak of the 4 f orbit (Au4f) of a gold atom is observed at 84.0 eV. Moreover, the peak of C1s of the surface contamination carbon is observed at 284.8 eV. On the other hand, in the case where the charge density of the carbon element increases, for example, in the case where carbon is bonded to a metal element or a metalloid element, the peak of C1s is observed in a region lower than 284.5 eV. In other words, in the case where the peak of the composite wave of C1s obtained in the CoSnC-containing material is observed in a region lower than 284.5 eV, at least a part of carbon included in the CoSnC-containing material is bonded to the metal element or the metalloid element which is another element.

Moreover, in the XPS measurement, for example, the peak of C1s is used to correct the energy axis of a spectrum. In general, surface contamination carbon exists on a material surface, so the peak of C1s of the surface contamination carbon is fixed at 284.8 eV, and the peak is used as an energy reference. In the XPS measurement, the waveform of the peak of C1s is obtained as a form including the peak of the surface contamination carbon and the peak of carbon in the CoSnC-containing material, so the peak of the surface contamination carbon and the peak of the carbon in the CoSnC-containing material are separated by analyzing the waveform through the use of, for example, commercially available software. In the analysis of the waveform, the position of a main peak existing on a lowest binding energy side is used as an energy reference (284.8 eV).

As the anode material capable of inserting and extracting lithium, for example, a carbon material such as graphite, non-graphitizable carbon or graphitizable carbon may be used, and the carbon material and the above-described anode material may be used together. In the carbon material, a change in crystal structure according to insertion and extraction of lithium is very small, so the carbon material is preferably used together with the above-described anode material, because a high energy density and superior cycle characteristics can be obtained, and the carbon material also functions as an electrical conductor.

In the secondary battery, the amounts of the cathode active material and the anode material capable of inserting and extracting lithium are adjusted so that a charge capacity by the anode material capable of inserting and extracting lithium becomes larger than a charge capacity by the cathode active material, thereby lithium metal is not precipitated on the anode 22 even at the time of full charge.

The separator 23 isolates between the cathode 21 and the anode 22 so that lithium ions pass therethrough while preventing a short circuit of a current due to contact between the cathode 21 and the anode 22. The separator 23 is made of, for example, a porous film of a synthetic resin such as polytetrafluoroethylene, polypropylene or polyethylene, or a porous ceramic film, and the separator 23 may have a structure in which two or more kinds of the porous films are laminated.

The separator 23 is impregnated with the electrolytic solution according to the embodiment of the invention.

The secondary battery can be manufactured by the following steps, for example.

At first, for example, the cathode active material layer 21B is formed on the cathode current collector 21A so as to form the cathode 21. The cathode active material layer 21B is formed by the following steps. After cathode active material powder, the electrical conductor and the binder are mixed to form a cathode mixture, the cathode mixture is dispersed in a solvent such as N-methyl-2-pyrrolidone to form paste-form cathode mixture slurry, and the cathode mixture slurry is applied to the cathode current collector 21A, and the cathode mixture slurry is dried and compression molded, thereby the cathode active material layer 21B is formed. Moreover, for example, as in the case of the cathode 21, the anode active material layer 22B is formed on the anode current collector 22A so as to form the anode 22.

Next, the cathode lead 25 is attached to the cathode current collector 21A by welding or the like, and the anode lead 26 is attached to the anode current collector 22A by welting or the like. Then, the cathode 21 and the anode 22 are spirally wound with the separator 23 in between, and a front end portion of the cathode lead 25 is welded to the safety valve mechanism 15, and a front end portion of the anode lead 26 is welded to the battery can 11. Next, the cathode 21 and the anode 22 which are spirally wound are sandwiched between the pair of insulating plates 12 and 13, and they are contained in the battery can 11. After the cathode 21 and the anode 22 are contained in the battery can 11, the electrolytic solution is injected into the battery can 11 so as to impregnate the separator 23 with the electrolytic solution. After that, the battery cover 14, the safety valve mechanism 15 and the PTC device 16 are fixed in an opened end portion of the battery can 11 by caulking by the gasket 17. Thereby, the secondary battery shown in FIGS. 1 and 2 is completed.

When the secondary battery is charged, lithium ions are extracted from the cathode 21, and are inserted into the anode 22 through the electrolytic solution. On the other hand, when the secondary battery is discharged, the lithium ions are extracted from the anode 22 and are inserted into the cathode 21 through the electrolytic solution. At this time, as the cyclic imide salt and the light metal salt shown in Chemical Formula 5 are included in the electrolytic solution, the decomposition reaction of the electrolytic solution can be prevented even at high temperature.

Thus, in the secondary battery, the cyclic imide salt and the light metal salt shown in Chemical Formula 5 are included, so the decomposition reaction of the electrolytic solution can be prevented even at high temperature, and the battery characteristics can be improved.

In particular, when the content of the light metal salt shown in Chemical Formula 3 in the electrolytic solution is within a range from 0.05 wt % to 10 wt % inclusive, a higher effect can be obtained.

(Second Secondary Battery)

A second secondary battery has the same structure, functions and effects as those of the first secondary battery, except that the structure of an anode is different, and the second secondary battery can be formed by the same method. Therefore, the second secondary battery will be described referring to FIGS. 1 and 2, and like components are denoted by like numerals as of the first secondary battery, and will not be further described.

The anode 22 has a structure in which the anode active material layer 22B is arranged on both sides of the anode current collector 22A as in the case of the first secondary battery. The anode active material layer 22B includes, for example, an anode active material including tin or silicon as an element. More specifically, for example, the anode active material includes the simple substance, an alloy or a compound of tin, or the simple substance, an alloy or a compound of silicon, and the anode active material may include two or more kinds selected from them.

Moreover, the anode active material layer 22B is formed by, for example, a vapor-phase method, a liquid-phase method, a spraying method or a firing method, or a combination of two or more methods selected from them, and the anode active material layer 22B and the anode current collector 22A are preferably alloyed in at least a part of an interface therebetween. More specifically, in the interface, an element of the anode current collector 22A is preferably diffused into the anode active material layer 22B, or an element of the anode active material is preferably diffused into the anode current collector 22A, or they are preferably diffused into each other, because a fracture of the anode active material layer 22B due to expansion and shrinkage thereof according to charge and discharge can be prevented, and the electronic conductivity between the anode active material layer 22B and the anode current collector 22A can be improved.

As the vapor-phase method, for example, a physical deposition method or a chemical deposition method can be used, and more specifically, a vacuum deposition method, a sputtering method, an ion plating method, a laser ablation method, a thermal CVD (chemical vapor deposition) method, a plasma chemical vapor deposition method or the like can be used. As the liquid-phase method, a known technique such as electrolytic plating or electroless plating can be used. In the firing method, for example, a particulate anode active material is mixed with a binder or the like to form a mixture, and the mixture is dispersed in a solvent, and is applied, and then the mixture is heated at a higher temperature than the melting point of the binder or the like. As the firing method, a known technique such as, for example, an atmosphere firing method, a reaction firing method or a hot press firing method can be used.

(Third Secondary Battery)

A third secondary battery is a so-called lithium metal secondary battery in which the capacity of the anode 22 is represented by a capacity component by precipitation and dissolution of lithium. The secondary battery has the same structure as that of the first secondary battery, except that the anode active material layer 22B is made of lithium metal, and the secondary battery can be manufactured by the same method. Therefore, the third secondary battery will be described referring to FIGS. 1 and 2, and like components are denoted by like numerals as of the first secondary battery, and will not be further described.

In other words, the secondary battery uses lithium metal as the anode active material, so a higher energy density can be obtained. The anode active material layer 22B may exist at the time of assembling, or the anode active material layer 22B may not exist at the time of assembling, but may be formed of lithium metal precipitated at the time of charge. Moreover, the anode active material layer 22B may be used also as a current collector, and the anode current collector 22A may be removed.

In the secondary battery, the electrolytic solution preferably includes a cyclic carbonate derivative having a halogen atom in addition to the cyclic imide salt, and may further include the above-described other component, because when the electrolytic solution includes them, compared to the case where the electrolytic solution includes only either of them, an effect of preventing the decomposition reaction of the solvent can be remarkably improved. In this case, the content of the cyclic carbonate derivative having a halogen atom in the solvent is preferably 50 vol % or less, because a higher effect can be obtained.

When the secondary battery is charged, lithium ions are extracted from the cathode 21, and the lithium ions are precipitated on the surface of the anode current collector 22A as lithium metal through the electrolytic solution. When the secondary battery is discharged, the lithium metal is eluted from the anode active material layer 22B as lithium ions, and the lithium ions are inserted into the cathode 21 through the electrolytic solution. In the secondary battery, the electrolytic solution includes the cyclic imide salt and the light metal salt shown in Chemical Formula 5, so the decomposition reaction of the electrolytic solution can be prevented even at high temperature.

Thus, in the secondary battery, the electrolytic solution includes the cyclic imide salt and the light metal salt shown in Chemical Formula 5, so the decomposition reaction of the electrolytic solution can be prevented even at high temperature, and the battery characteristics can be improved.

(Fourth Secondary Battery)

FIG. 3 shows the structure of a fourth secondary battery. The secondary battery is a so-called laminate film type, and in the secondary battery, a spirally wound electrode body 30 to which a cathode lead 31 and an anode lead 32 are attached is contained in film-shaped package members 40.

The cathode lead 31 and the anode lead 32 are drawn from the interiors of the package members 40 to outside, for example, in the same direction. The cathode lead 31 and the anode lead 32 are made of, for example, a metal material such as aluminum, copper, nickel or stainless in a sheet shape or a mesh shape.

The package members 40 are made of, for example, a rectangular aluminum laminate film including a nylon film, aluminum foil and a polyethylene film which are bonded in this order. The package members 40 are disposed so that the polyethylene film of each of the package members 40 faces the spirally wound electrode body 30, and edge portions of the package members 40 are adhered to each other by fusion bonding or an adhesive. An adhesive film 41 is inserted between the package members 40 and the cathode lead 31 and the anode lead 32 for preventing the entry of outside air. The adhesive film 41 is made of, for example, a material having adhesion to the cathode lead 31 and the anode lead 32, for example, a polyolefin resin such as polyethylene, polypropylene, modified polyethylene or modified polypropylene.

In addition, the package members 40 may be made of a laminate film with any other structure, a polymer film such as polypropylene or a metal film instead of the above-described aluminum laminate film.

Figure 4:
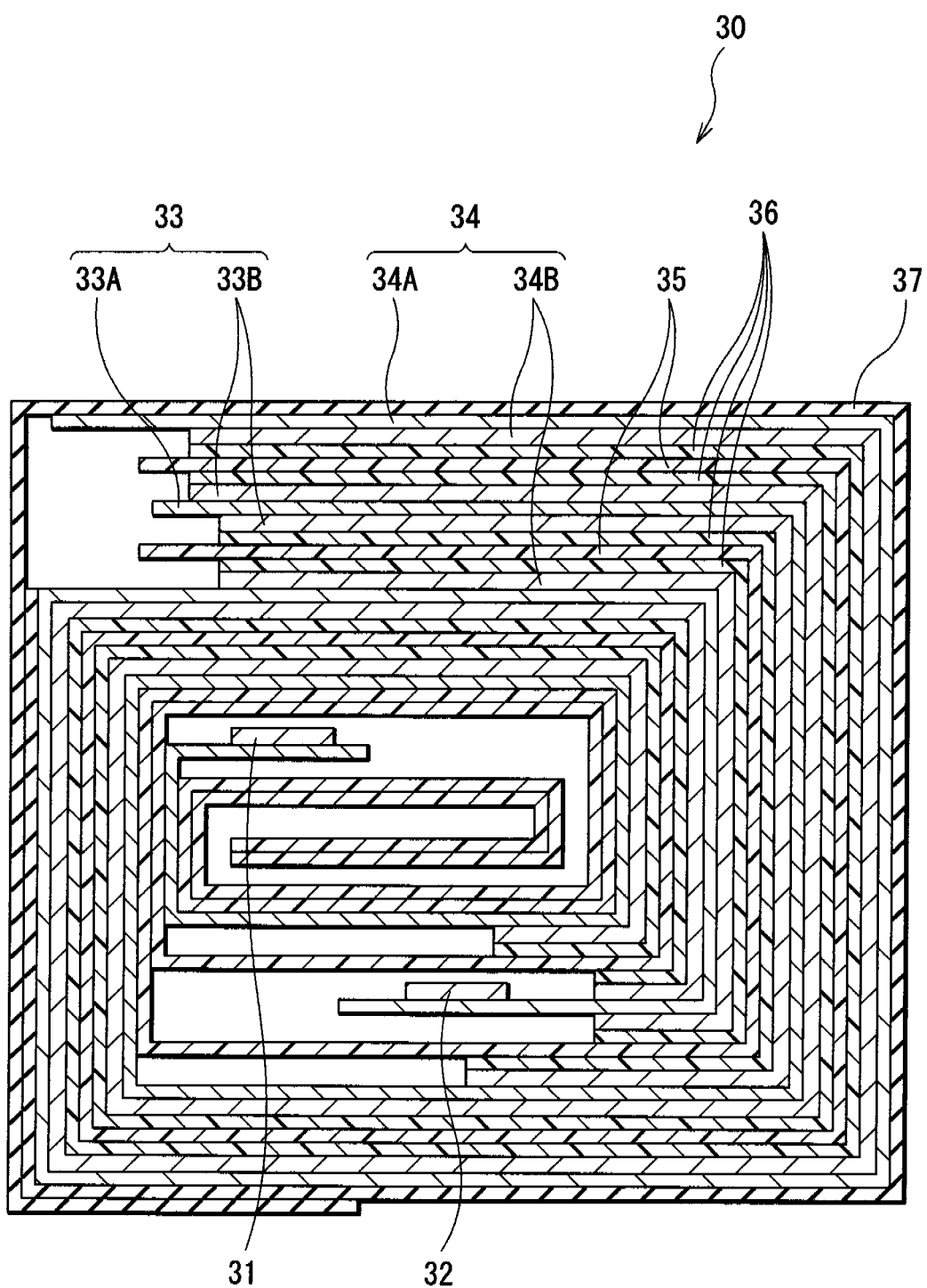
FIG. 4 is a sectional view of the spirally wound electrode body taken along a line I-I of FIG. 3.

FIG. 4 shows a sectional view of the spirally wound electrode body 30 taken along a line I-I of FIG. 3. The spirally wound electrode body 30 is a spirally wound laminate including a cathode 33 and an anode 34 with a separator 35 and an electrolyte layer 36 in between, and an outermost portion of the spirally wound electrode body 30 is protected with a protective tape 37.

The cathode 33 has a structure in which a cathode active material layer 33B is arranged on both sides of a cathode current collector 33A. The anode 34 has a structure in which an anode active material layer 34B is arranged on both sides of an anode current collector 34A, and the anode 34 is disposed so that the anode active material layer 34B faces the cathode active material layer 33B. The structures of the cathode current collector 33A, the cathode active material layer 33B, the anode current collector 34A, the anode active material layer 34B and the separator 35 are the same as those of the cathode current collector 21A, the cathode active material layer 21B, the anode current collector 22A, the anode active material layer 22B and the separator 23 in the above-described first, second and third secondary batteries, respectively.

The electrolyte layer 36 includes the electrolytic solution according to the embodiment and a polymer compound as a holding body which holds the electrolytic solution, and is a so-called gel electrolyte. The gel electrolyte is preferable, because the gel electrolyte can obtain high ionic conductivity, and can prevent liquid leakage from the battery. As the polymer compound, for example, an ether-based polymer compound such as polyethylene oxide or a cross-link including polyethylene oxide, an ester-based polymer compound such as polymethacrylate, an acrylate-based polymer compound, or polyvinylidene fluoride, or a polymer of vinylidene fluoride such as a copolymer of vinylidene fluoride and hexafluoropropylene, and one kind or a mixture including two or more kinds selected from them is used. More specifically, in terms of stability of oxidation-reduction, the fluororine-based polymer compound is preferable.

The secondary battery can be manufactured by the following steps, for example.

At first, the electrolyte layer 36 is formed by applying a precursor solution including the electrolytic solution, the polymer compound and a mixed solvent to the cathode 33 and the anode 34, and volatilizing the mixed solvent. Next, the cathode lead 31 is attached to the cathode current collector 33A, and the anode lead 32 is attached to the anode current collector 34A. Next, after the cathode 33 on which the electrolyte layer 36 is formed and the anode 34 on which the electrolyte layer 36 is formed are laminated with the separator 35 in between to form a laminate, the laminate is spirally wound in a longitudinal direction, and the protective tape 37 is bonded to an outermost portion of the laminate so as to form the spirally wound electrode body 30. After that, for example, the spirally wound electrode body 30 is sandwiched between the package members 40, and edge portions of the package members 40 are adhered to each other by thermal fusion bonding or the like to seal the spirally wound electrode body 30 in the package members 40. At this time, the adhesive film 41 is inserted between the cathode lead 31, the anode lead 32 and the package members 40. Thereby, the secondary battery shown in FIGS. 3 and 4 is completed.

Moreover, the secondary battery may be manufactured by the following steps. At first, as described above, the cathode 33 and the anode 34 are formed, and the cathode lead 31 and the anode lead 32 are attached to the cathode 33 and the anode 34, respectively. Then, the cathode 33 and the anode 34 are laminated with the separator 35 in between to form a laminate, and the laminate is spirally wound. The protective tape 37 is bonded to an outermost portion of the spirally wound laminate so as to form a spirally wound body as a precursor body of the spirally wound electrode body 30. Next, the spirally wound body is sandwiched between the package members 40, and the edge portions of the package members 40 except for one side are adhered by thermal fusion bonding to form a pouched package, thereby the spirally wound body is contained in the package members 40. Electrolytic compositions which include the electrolytic solution, monomers as materials of a polymer compound and a polymerization initiator and, if necessary, any other material such as a polymerization inhibitor are injected in the package members 40, and then an opened portion of the package members 40 are sealed by thermal fusion bonding. After that, the monomers are polymerized by applying heat to form the polymer compound, thereby the gel electrolyte layer 36 is formed so as to assemble the secondary battery shown in FIGS. 3 and 4.

The functions and effects of the secondary battery is the same as those of the above-described first, second and third secondary batteries.

EXAMPLES

Specific examples of the invention will be described in detail below.

Examples 1-1 to 1-14

Cylindrical type secondary batteries shown in FIGS. 1 and 2 were formed. At first, lithium carbonate ($Li_2CO_3$) and cobalt carbonate ($CoCO_3$) were mixed at a molar ratio of 0.5:1, and the mixture was fired in air at 890° C. for 5 hours to obtain lithium cobalt complex oxide ($LiCoO_2$). When the X-ray diffraction was conducted on the obtained lithium cobalt complex oxide, the diffraction pattern of the obtained $LiCoO_2$ closely matched the peak of $LiCoO_2$ listed in the JCPDS (Joint Committee of Powder Diffraction Standard) file. Next, the lithium cobalt complex oxide was pulverized into a powder form with an average particle diameter of 10 μm so as to form a cathode active material.

Next, 95 parts by weight of $LiCoO_2$ and 5 parts by weight of $Li_2CO_3$ powder were mixed to form a mixture, and 91 parts by weight of the mixture, 6 parts by weight of artificial graphite as an electrical conductor and 3 parts by weight of polyvinylidene fluoride as a binder were mixed to prepare a mixture, and then the mixture was dispersed in N-methyl-2-pyrrolidone as a solvent to form cathode mixture slurry. Next, after the cathode mixture slurry was uniformly applied to both sides of the cathode current collector 21A made of strip-shaped aluminum foil with a thickness of 20 μm, and was dried, the cathode mixture layer 21B was formed by compression molding so as to form the cathode 21. After that, the cathode lead 25 made of aluminum was attached to one end of the cathode current collector 21A.

Moreover, graphite was used as the anode active material, and 97 parts by weight of graphite and 3 parts by weight of polyvinylidene fluoride as a binder were mixed to form a mixture, and the mixture was dispersed in N-methyl-2-pyrrolidone as a solvent to form anode mixture slurry, and then the anode mixture slurry was applied to the anode current collector 22A made of strip-shaped copper foil, and was dried to form the anode active material layer 22B, thereby the anode 22 was formed. At that time, the filling amounts of the cathode active material and the anode active material were adjusted so that the capacity of the anode 22 was represented by a capacity component by insertion and extraction of lithium. After that, the anode lead 26 made of nickel was attached to one end of the anode current collector 22A.

After the cathode 21 and the anode 22 were formed, the separator 23 made of polyethylene with a thickness of 25 μm was prepared, and the anode 22, the separator 23, the cathode 21 and separator 23 were laminated in this order to form a laminate, and the laminate was spirally wound several times, and an outermost part of the spirally wound laminate was secured with an adhesive tape, thereby the spirally wound electrode body 20 was formed.

After the spirally wound electrode body 20 was formed, the spirally wound electrode body 20 was sandwiched between a pair of insulating plates 12 and 13, and the anode lead 26 was welded to the battery can 11, and the cathode lead 25 was welded to the safety valve mechanism 15, and then the spirally wound electrode body 20 was contained in the battery can 11 made of nickel-plated iron. After that, the electrolytic solution was injected into the battery can 11 by a decompression method, thereby cylindrical type secondary batteries were formed. In Examples 1-1 through 1-5, the electrolytic solution was formed by mixing ethylene carbonate (EC) dimethyl carbonate (DMC) as solvents, lithium hexafluorophosphate, 1,1,2,2,3,3-hexafluoropropane-1,3-disulfonimide lithium shown in Chemical Formula 4(1) which was the cyclic imide salt, and difluoro[oxalato-O,O'] lithium borate shown in Chemical Formula 9(1) which was the light metal salt shown in Chemical Formula 5 as the electrolyte salts, and changing the mixture ratio of 1,1,2,2,3,3-hexafluoropropane-1,3-disulfonimide lithium in the whole electrolytic solution to be 0.1 wt % to 31 wt %. The ratios of the solvents and the electrolyte salts in the electrolytic solution were as shown in Table 1.

TABLE 1

Anode active material: graphite

| | SOLVENT (WT %) | | | CYCLIC IMIDE SALT | | LIGHT METAL SALT OF CHEMICAL FORMULA 5 | | DISCHARGE CAPACITY RETENTION RATIO (%) | |
|---|---|---|---|---|---|---|---|---|---|
| | ETHYLENE CARBONATE | DIMETHYL CARBONATE | LiPF$_6$ (WT %) | KIND | WT % | KIND | WT % | 25° C. | 50° C. |
| EXAMPLE 1-1 | 42.175 | 42.175 | 14.6 | CHEMICAL FORMULA 4(1) | 1 | CHEMICAL FORMULA 9(1) | 0.05 | 97.7 | 97.3 |
| EXAMPLE 1-2 | 42.2 | 42.2 | 14.4 | | | | 0.2 | 99.4 | 99.3 |
| EXAMPLE 1-3 | 42.2 | 42.2 | 13.6 | | | | 1 | 99.5 | 99.3 |
| EXAMPLE 1-4 | 42.3 | 42.3 | 9.4 | | | | 5 | 98.6 | 98.2 |
| EXAMPLE 1-5 | 42.5 | 42.5 | 4.0 | | | | 10 | 97.7 | 97.2 |
| EXAMPLE 1-6 | 42.175 | 42.175 | 14.6 | CHEMICAL FORMULA 4(1) | 1 | CHEMICAL FORMULA 9(6) | 0.05 | 97.7 | 97.2 |
| EXAMPLE 1-7 | 42.2 | 42.2 | 14.4 | | | | 0.2 | 99.3 | 99.1 |
| EXAMPLE 1-8 | 42.05 | 42.05 | 13.9 | | | | 1 | 99.3 | 99.1 |
| EXAMPLE 1-9 | 41.6 | 41.6 | 10.8 | | | | 5 | 98.4 | 97.9 |
| EXAMPLE 1-10 | 41.1 | 41.1 | 6.8 | | | | 10 | 97.7 | 97.2 |
| EXAMPLE 1-11 | 42.425 | 42.425 | 15 | CHEMICAL FORMULA 4(1) | 0.1 | CHEMICAL FORMULA 9(1) | 0.05 | 97.4 | 95.2 |
| EXAMPLE 1-12 | 42.325 | 42.325 | 15 | | 0.3 | | | 97.6 | 95.8 |
| EXAMPLE 1-1 | 42.175 | 42.175 | 14.6 | | 1 | | | 97.7 | 97.3 |
| EXAMPLE 1-13 | 38.725 | 38.725 | 7.5 | | 15 | | | 97.6 | 96.1 |
| EXAMPLE 1-14 | 34.475 | 34.475 | 0 | | 31 | | | 97.3 | 95.2 |
| COMPARATIVE EXAMPLE 1-1 | 42.5 | 42.5 | 15.0 | — | — | — | — | 97.3 | 89.8 |
| COMPARATIVE EXAMPLE 1-2 | 42.2 | 42.2 | 14.6 | CHEMICAL FORMULA 4(1) | 1 | — | — | 97.5 | 95.1 |
| COMPARATIVE EXAMPLE 1-3 | 42.5 | 42.5 | 14.0 | — | — | CHEMICAL FORMULA 9(1) | 1 | 97.5 | 91.2 |
| COMPARATIVE EXAMPLE 1-4 | 42.5 | 42.5 | 14.0 | — | — | CHEMICAL FORMULA 9(6) | 1 | 97.5 | 91.1 |

Chemical Formula 4(1); 1,1,2,2,3,3-hexafluoropropane-1,3-disulfonimide lithium
Chemical Formula 9(1); difluoro[oxalato-O,O'] lithium borate
Chemical Formula 9(6); bis[oxalato-O,O'] lithium borate cyclic imide salt and difluoro[oxalato-O,O'] lithium borate shown in Chemical Formula 9(1) which was the light metal salt shown in Chemical Formula 5 as the electrolyte salts, and changing the mixture ratio of difluoro[oxalato-O,O'] lithium borate in the whole electrolytic solution to be 0.02 wt % to 10 wt %. In Examples 1-6 through 1-10, the electrolytic solution was formed by mixing ethylene carbonate and dimethyl carbonate as solvents, lithium hexafluorophosphate, 1,1,2,2,3,3-hexafluoropropane-1,3-disulfonimide lithium shown in Chemical Formula 4(1) which was the cyclic imide salt and bis[oxalato-O,O'] lithium borate shown in Chemical Formula 9(6) which was the light metal salt shown in Chemical Formula 5 as the electrolyte salts, and changing the mixture ratio of bis[oxalato-O,O'] lithium borate in the whole electrolytic solution to be 0.02 wt % to 10 wt %. In Examples 1-11 through 1-14, the electrolytic solution was formed by mixing ethylene carbonate and dimethyl carbonate as solvents, lithium hexafluorophosphate, 1,1,2,2,3,3-hexafluoropropane-1,3-disulfonimide lithium shown in Chemical Formula As Comparative Example 1-1, a secondary battery was formed as in the case of Examples 1-1 through 1-10, except that the cyclic imide salt and the light metal salt shown in Chemical Formula 5 were not used. As Comparative Example 1-2, a secondary battery was formed as in the case of Examples 1-1 through 1-10, except that the light metal salt shown in Chemical Formula 5 was not used. As Comparative Examples 1-3 and 1-4, secondary batteries were formed as in the case of Examples 1-1 through 1-5 and Example 1-6 through 1-10, respectively, except that the cyclic imide salt was not used. The ratios of solvents and the electrolyte salts in the electrolytic solution were as shown in Table 1.

The cycle characteristics of the secondary batteries of Examples 1-1 through 1-14 and Comparative Examples 1-1 through 1-4 at 25° C. and 50° C. were determined. The results are shown in Table 1. The cycle characteristics were determined by the following steps. As a charge-discharge cycle, at 25° C. or 50° C., the secondary batteries were charged at 1.77 mA under condition that a maximum voltage was 4.2 V for 12 hours, and then after a 10-minute interval, the secondary batteries were discharged at 1.77 mA until reaching 2.5 V, and the charge-discharge cycle was repeated to determine the cycle characteristics as the discharge capacity retention ratio in the 50th cycle to the discharge capacity in the first cycle, that is, (discharge capacity in the 50th cycle/the discharge capacity in the first cycle)×100(%).

As shown in Table 1, in Examples 1-3 and 1-8 in which the cyclic imide salt and the light metal salt shown in Chemical Formula 5 were used, compared to Comparative Example 1-1 in which they were not used, Comparative Example 1-2 in which the light metal salt shown in Chemical Formula 5 was not used, or Comparative Examples 1-3 and 1-4 in which the cyclic imide salt was not used, the discharge capacity retention ratio was remarkably improved.

Moreover, there was a tendency that as the content of the light metal salt shown in Chemical Formula 5 increased, the discharge capacity retention ratio increased to a maximum value, then decreased.

Further, there was a tendency that as the content of the cyclic imide salt increased, the discharge capacity retention ratio increased to a maximum value, then decreased.

In other words, it was found out that when the cyclic imide salt and the light metal salt shown in Chemical Formula 5 were included in the electrolytic solution, the cycle characteristics could be improved even at high temperature. Moreover, it was found out that the content of the light metal salt shown in Chemical Formula 5 in the electrolytic solution was preferably within a range from 0.05 wt % to 10 wt % inclusive, or the content of the cyclic imide salt was preferably within a range from 0.1 wt % to 31 wt % inclusive.

Examples 2-1 to 2-3

Secondary batteries were formed as in the case of Examples 1-1 through 1-10, except that CoSnC-containing material powder was used as the anode active material, and after 80 parts by weight of the CoSnC-containing material powder, 14 parts by weight of artificial graphite (KS-16, Lonza) and 1 part by weight of acetylene black as electrical conductors, and 5 parts by weight of polyvinylidene fluoride as a binder were dispersed in N-methyl-2-pyrrolidone to form slurry, the slurry was uniformly applied to the anode current collector 22A made of copper foil, and dried to form the anode active material layer 22B. At that time, the filling amounts of the cathode active material and the anode active material were adjusted so that the capacity of the anode 22 was represented by a capacity component by insertion and extraction of lithium. Moreover, as the electrolytic solution, a mixture including ethylene carbonate and dimethyl carbonate as the solvents, lithium hexafluorophosphate, 1,1,2,2,3,3-hexafluoropropane-1,3-disulfonimide lithium shown in Chemical Formula 4(1) which was the cyclic imide salt, and at least one of difluoro[oxalato-O,O'] lithium borate shown in Chemical Formula 9(1) and bis[oxalato-O,O'] lithium borate shown in Chemical Formula 9(6) which were the light metal salts shown in Chemical Formula 5 as the electrolyte salts was used. The ratios of the solvents and the electrolyte salts in the electrolytic solution were as shown in Table 2.

TABLE 2

Anode active material; 50Sn—29.4Co—19.6C

| | ELECTROLYTIC SOLUTION | | | | | | | DISCHARGE CAPACITY RETENTION RATIO (%) | |
|---|---|---|---|---|---|---|---|---|---|
| | SOLVENT (WT %) | | | ELECTROLYTE SALT | | | | | |
| | | | | CYCLIC IMIDE SALT | | LIGHT METAL SALT OF CHEMICAL FORMULA 5 | | | |
| | ETHYLENE CARBONATE | DIMETHYL CARBONATE | LiPF$_6$ (WT %) | KIND | WT % | KIND | WT % | 25° C. | 50° C. |
| EXAMPLE 2-1 | 38.3 | 38.3 | 7.4 | CHEMICAL FORMULA 4(1) | 15 | CHEMICAL FORMULA 9(1) | 1 | 63 | 61 |
| EXAMPLE 2-2 | 38.3 | 38.3 | 7.4 | | | CHEMICAL FORMULA 9(6) | 1 | 66 | 65 |
| EXAMPLE 2-3 | 38.3 | 38.3 | 7.4 | | | CHEMICAL FORMULA 9(1) | 0.5 | 65 | 64 |
| | | | | | | CHEMICAL FORMULA 9(6) | 0.5 | | |
| COMPARATIVE EXAMPLE 2-1 | 42.5 | 42.5 | 15.0 | — | — | — | — | 60 | 52 |
| COMPARATIVE EXAMPLE 2-2 | 38.7 | 38.7 | 7.6 | CHEMICAL FORMULA 4(1) | 15 | — | — | 61 | 55 |
| COMPARATIVE EXAMPLE 2-3 | 42.5 | 42.5 | 14.0 | — | — | CHEMICAL FORMULA 9(1) | 1 | 62 | 54 |
| COMPARATIVE EXAMPLE 2-4 | 42.5 | 42.5 | 14.0 | — | — | CHEMICAL FORMULA 9(6) | 1 | 65 | 60 |

Figure 5:
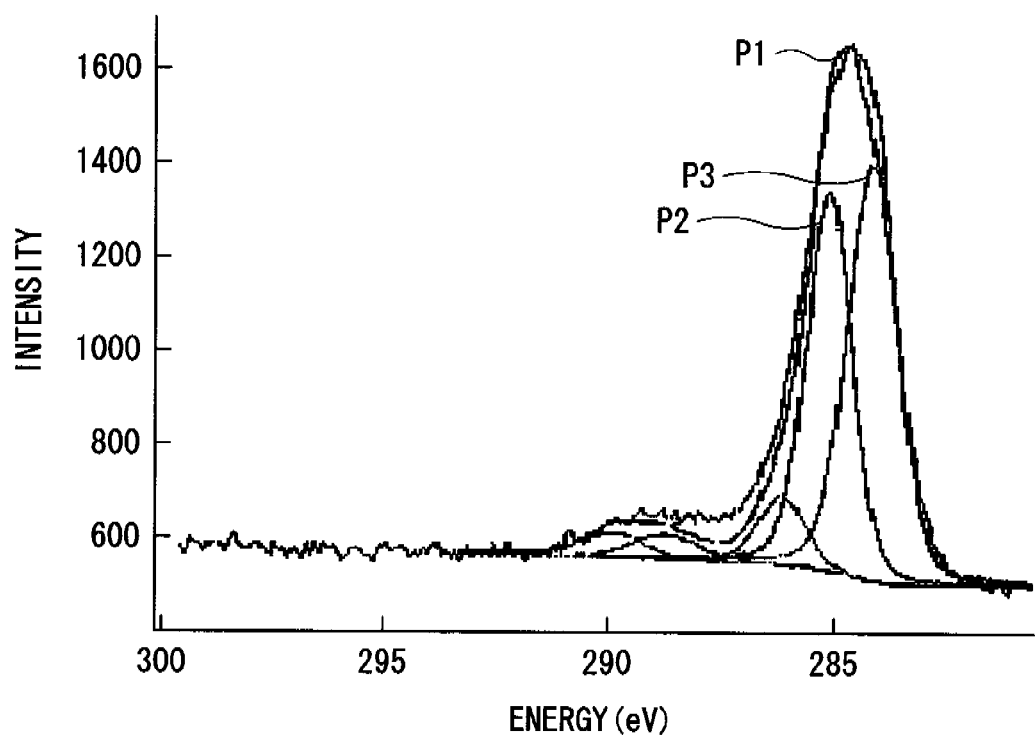
FIG. 5 is an illustration showing an example of peaks obtained by X-ray photoelectron spectroscopy relating to a CoSnC-containing material formed in an example.

Chemical Formula 4(1); 1,1,2,2,3,3-hexafluoropropane-1,3-disulfonimide lithium
Chemical Formula 9(1); difluoro[oxalato-O,O'] lithium borate
Chemical Formula 9(6); bis[oxalato-O,O'] lithium borate The CoSnC-containing material powder was synthesized by mixing tin-cobalt alloy powder and carbon powder, and using a mechanochemical reaction. When the composition of the obtained CoSnC-containing material was analyzed, the tin content was 50 wt %, the cobalt content was 29.4 wt %, the carbon content was 19.6 wt %, and the ratio of cobalt to the total of tin and cobalt (Co/(Sn+Co)) was 37 wt %. The carbon content was measured by a carbon/sulfur analyzer, and the contents of tin and cobalt were measured by ICP (Inductively Coupled Plasma) emission spectrometry. Moreover, when X-ray diffraction was performed on the CoSnC-containing material, a diffraction peak having a broad half-width in which the diffraction angle $2\theta$ was $1.0°$ or more was observed within a range of the diffraction angle $2\theta=20°$ to $50°$. Further, when the XPS measurement was performed on the CoSnC-containing material, a peak P1 shown in FIG. 5 was obtained. When the peak P1 was analyzed, a peak P2 of surface contamination carbon and a peak P3 of C1s in the CoSnC-containing material on a lower energy side than the peak P2 were obtained. The peak P3 was obtained in a region lower than 284.5 eV. In other words, it was confirmed that carbon included in the CoSnC-containing material was bonded to another element.

As Comparative Example 2-1 relative to Examples 2-1 through 2-3, a secondary battery was formed as in the case of Examples 2-1 through 2-3, except that the cyclic imide salt and the light metal salt shown in Chemical Formula 5 were not used. As Comparative Example 2-2, a secondary battery was formed as in the case of Examples 2-1 through 2-3, except that the light metal salt shown in Chemical Formula 5 was not used. As Comparative Examples 2-3 and 2-4, secondary batteries were formed as in the case of Examples 2-1 through 2-3, except that the cyclic imide salt was not used. The ratios of the solvents and the electrolyte salts were as shown in Table 2.

As shown in Table 2, in Examples 2-1 through 2-3 in which the cyclic imide salt and the light metal salt shown in Chemical Formula 5 were used, compared to Comparative Example 2-1 in which they were not used, Comparative Example 2-2 in which the light metal salt shown in Chemical Formula 5 was not used, or Comparative Examples 2-3 and 2-4 in which the cyclic imide salt was not used, the discharge capacity retention ratio was improved specifically at high temperature.

In other words, it was found out that even in the case where another anode active material was used, when the cyclic imide salt and the light metal salt shown in Chemical Formula 5 were included in the electrolytic solution, the cycle characteristics could be improved even at high temperature.

Examples 3-1 and 3-2

Batteries in which the capacity of the anode 22 was represented by a capacity component by precipitation and dissolution of lithium, that is, so-called lithium metal secondary batteries were formed. More specifically, the secondary batteries were formed as in the case of Examples 1-1 through 1-10, except that lithium metal foil with a thickness of 30 µm was bonded to the anode current collector 22A made of strip-shaped copper foil with a thickness of 10 µm to form the anode active material layer 22B, thereby the anode 22 was formed. Moreover, as the electrolytic solution, a mixture including ethylene carbonate and dimethyl carbonate as solvents, lithium hexafluorophosphate, 1,1,2,2,3,3-hexafluoropropane-1,3-disulfonimide lithium shown in Chemical Formula 4(1) which was the cyclic imide salt, and diflouro [oxalato-O,O'] lithium borate shown in Chemical Formula 9(1) or bis[oxalato-O,O'] lithium borate shown in Chemical Formula 9(6) which was the light metal salt shown in Chemical Formula 5 as the electrolyte salts was used. The ratios of the solvents and the electrolyte salts in the electrolytic solution were as shown in Table 3.

TABLE 3

Anode active material; lithium metal

| | ELECTROLYTIC SOLUTION | | | | | | | | |
|---|---|---|---|---|---|---|---|---|---|
| | | | | ELECTROLYTE SALT | | | | DISCHARGE CAPACITY RETENTION RATIO (%) | |
| | SOLVENT (WT %) | | | CYCLIC IMIDE SALT | | LIGHT METAL SALT OF CHEMICAL FORMULA 5 | | | |
| | ETHYLENE CARBONATE | DIMETHYL CARBONATE | LiPF$_6$ (WT %) | KIND | WT % | KIND | WT % | 25° C. | 50° C. |
| EXAMPLE 3-1 | 38.3 | 38.3 | 7.4 | CHEMICAL FORMULA 4(1) | 15 | CHEMICAL FORMULA 9(1) | 1 | 67 | 70 |
| EXAMPLE 3-2 | 38.3 | 38.3 | 7.4 | | | CHEMICAL FORMULA 9(6) | 1 | 68 | 73 |
| COMPARATIVE EXAMPLE 3-1 | 42.5 | 42.5 | 15.0 | — | — | — | — | 37 | 34 |
| COMPARATIVE EXAMPLE 3-2 | 38.7 | 38.7 | 7.6 | CHEMICAL FORMULA 4(1) | 15 | — | — | 65 | 64 |
| COMPARATIVE EXAMPLE 3-3 | 42.5 | 42.5 | 14.0 | — | — | CHEMICAL FORMULA 9(1) | 1 | 55 | 50 |
| COMPARATIVE EXAMPLE 3-4 | 42.5 | 42.5 | 14.0 | — | — | CHEMICAL FORMULA 9(6) | 1 | 60 | 55 |

Chemical Formula 4(1); 1,1,2,2,3,3-hexafluoropropane-1,3-disulfonimide lithium
Chemical Formula 9(1); difluoro[oxalato-O,O'] lithium borate
Chemical Formula 9(6); bis[oxalato-O,O'] lithium borate As Comparative to Examples 3-1 and 3-2, a secondary battery was formed as in of Examples 3-1 and 3-2, except that the cyclic imide salt and the light metal salt shown in Chemical Formula 5 were not used. As Comparative Example 3-2, a secondary battery was formed as in the case of Examples 3-1 and 3-2, except that the light metal salt shown in Chemical Formula 5 was not used. As Comparative Examples 3-3 and 3-4, secondary batteries were formed as in the case of Examples 3-1 and 3-2, except that the cyclic imide salt was not used. The ratios of the solvents and the electrolyte salts in the electrolytic solution were as shown in Table 3.

As shown in Table 3, in Examples 3-1 and 3-2 in which the cyclic imide salt and the light metal salt shown in Chemical Formula 5 were used, compared to Comparative Example 3-1 in which they were not used, Comparative Example 3-2 in which the light metal salt shown in Chemical Formula 5 was not used, or Comparative Examples 3-3 and 3-4 in which the cyclic imide salt was not used, the discharge capacity retention ratio was improved.

In other words, it was found out that even in the battery in which the capacity of the anode 22 was represented by precipitation and dissolution of lithium, that is, a so-called lithium metal secondary battery, when the cyclic imide salt and the light metal salt shown in Chemical Formula 5 were included in the electrolytic solution, the cycle characteristics could be improved even at high temperature.

Although the present invention is described referring to the embodiment and examples, the invention is not specifically limited to them, and is variously modified. For example, in the above-described embodiment and the above-described examples, the case where the electrolytic solution is used as an electrolyte is described, and in the above-embodiment, the case where the gel electrolyte in which a polymer compound holds the electrolytic solution is described; however, any other electrolyte may be used. Examples of the electrolyte include a mixture of an ionic conducting inorganic compound such as ionic conducting ceramic, ionic conducting glass or ionic crystal and the electrolytic solution, a mixture of another inorganic compound and the electrolytic solution and a mixture of the inorganic compound and the gel electrolyte.

Moreover, in the embodiment and the examples, the battery using lithium as an electrode reactant is described; however, the invention is applicable to the case where any other alkali metal such as sodium (Na) or potassium (K), alkali earth metal such as magnesium or calcium (Ca) or any other light metal such as aluminum is used. At this time, in the anode, the anode active material described in the above embodiment, for example, a material including tin or silicon as an element, a carbon material, or the like can be used in the same manner.

Further, in the embodiment and the examples, a so-called lithium-ion secondary battery in which the capacity of the anode is represented by a capacity component by insertion and extraction of lithium, or a so-called lithium metal secondary battery in which lithium metal is used as the anode active material, and the capacity of the anode is represented by a capacity component by precipitation and dissolution of lithium is described; however, the invention is applicable to a secondary battery in which the charge capacity of an anode material capable of inserting and extracting lithium is smaller than the charge capacity of a cathode, thereby the capacity of an anode includes a capacity component by insertion and extraction of lithium and a capacity component by precipitation and dissolution of lithium, and is represented by the sum of them in the same manner.

In addition, in the embodiment and the examples, the cylindrical type secondary battery or the laminate film type secondary battery are described in detail; however, the invention is applicable to a secondary battery with any other shape such as a coin type, a button type, a prismatic type, or a secondary battery with any other structure such as a laminate structure in the same manner. Further, the invention is applicable to not only the secondary batteries but also other batteries such as primary batteries.

It should be understood by those skilled in the art that various modifications, combinations, sub-combinations and alterations may occur depending on design requirements and other factors insofar as they are within the scope of the appended claims or the equivalents thereof.

What is claimed is:

1. An electrolytic solution comprising (a) one of a cyclic imide salt shown in Chemical Formula 4(2), and (b) a light metal salt selected from the group consisting of Chemical Formulae 1 and 6 shown below Chemical Formulae 4(2), (1) and (6) being:

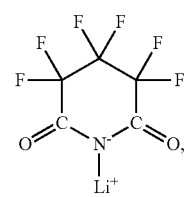

Chemical Formula 4(2)

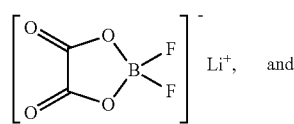

Chemical Formula (1)

and

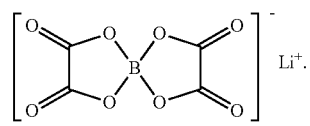

Chemical Formula (6)

2. The electrolytic solution according to claim 1, wherein the content of the imide salt is from 0.1 wt % to 31 wt %.

3. The electrolytic solution according to claim 1, wherein the content of the light metal salt shown in Chemical Formula 1 is from 0.05 wt % to 10 wt %.

4. The electrolytic solution according to claim 1, wherein the electrolyte further includes at least one kind selected from the group consisting of tetrafluoro[oxalato-O,O'] lithium phosphate shown in Chemical Formula (2), difluoro bis[oxalato-O,O'] lithium phosphate shown in Chemical Formula (3), difluoro[3,3,3-trifluoro-2-oxide-2-trifluoromethyl propionato(2-)-O,O'] lithium borate shown in Chemical Formula (4), and bis[3,3,3-trifluoro-2-oxide-2-trifluoromethyl propionato(2-)-O,O'] lithium borate shown in Chemical Formula (5):

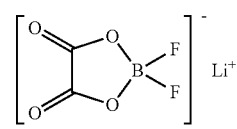

(1)

-continued (2)
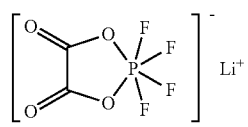

(3)
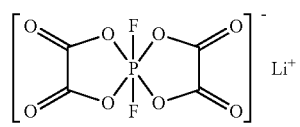

(4)
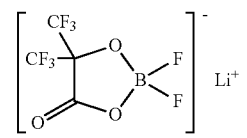

(5)
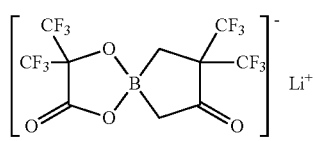

5. A battery comprising:
a cathode;
an anode; and
an electrolytic solution,
wherein,
the electrolytic solution includes, (a) one of a cyclic imide salt represented by chemical formula 4(2), and (b) a light metal salt selected from the group consisting of Chemical Formulae 1 and 6, Chemical formulae 4(2), (1), and (6) being:

Chemical Formula 4(2)
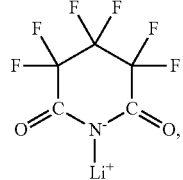

Chemical Formula (1)
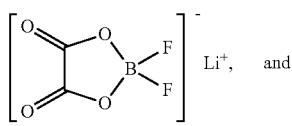, and

Chemical Formula (6)
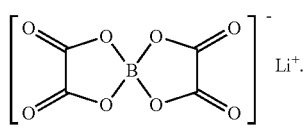.

6. The battery according to claim 5, wherein the content of the imide salt in the electrolytic solution is from 0.1 wt % to 31 wt %.

7. The battery according to claim 5, wherein the content of the light metal salt shown in Chemical Formula 1 in the electrolytic solution is from 0.05 wt % to 10 wt %.

8. The battery according to claim 5, wherein the electrolyte further includes at least one kind selected from the group consisting of tetrafluoro[oxalato-O,O'] lithium phosphate shown in Chemical Formula (2), difluoro bis[oxalato-O,O'] lithium phosphate shown in Chemical Formula (3), difluoro [3,3,3-trifluoro-2-oxide-2-trifluoromethyl propionato(2-)-O,O'] lithium borate shown in Chemical Formula (4), and bis [3,3,3-trifluoro-2-oxide-2-trifluoromethyl propionato(2-)-O,O'] lithium borate shown in Chemical Formula (5):

(2)

(3)
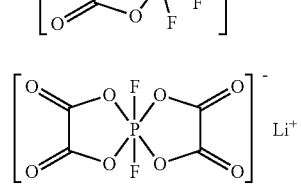

(4)
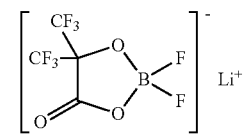

(5)
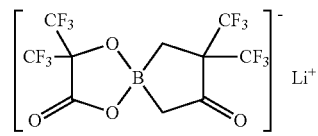

9. An electrolytic solution comprising (a) one of a cyclic imide salt shown in Chemical Formula 4(2), and (b) a light metal salt below in Chemical Formulae (1) being:

Chemical Formula 4(2):
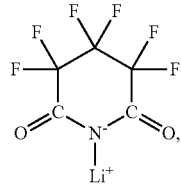 and

Chemical Formula (1):
(1)
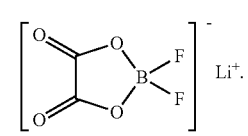.

* * * * *